Aug. 1, 1961     D. D. MICHEL     2,994,461
DISPENSING APPARATUS
Filed July 2, 1957     2 Sheets-Sheet 1
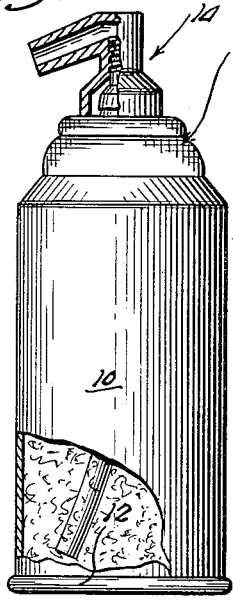
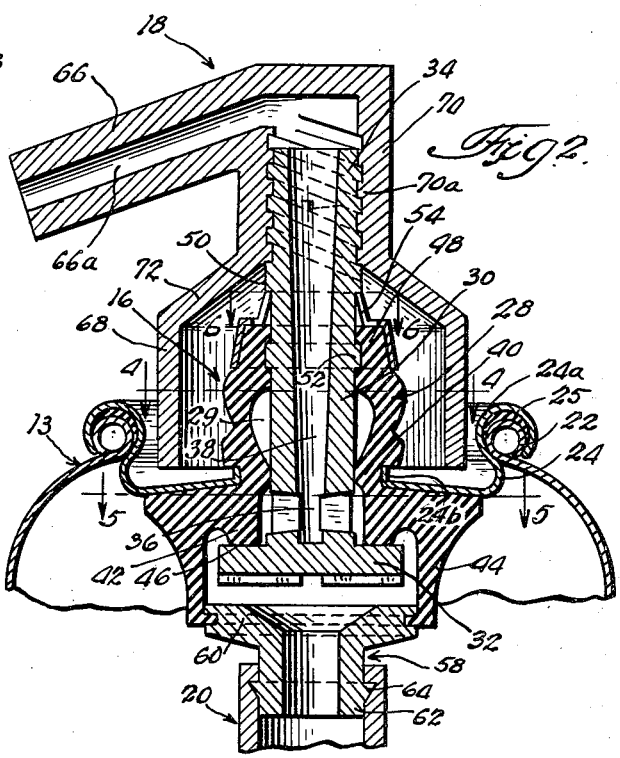
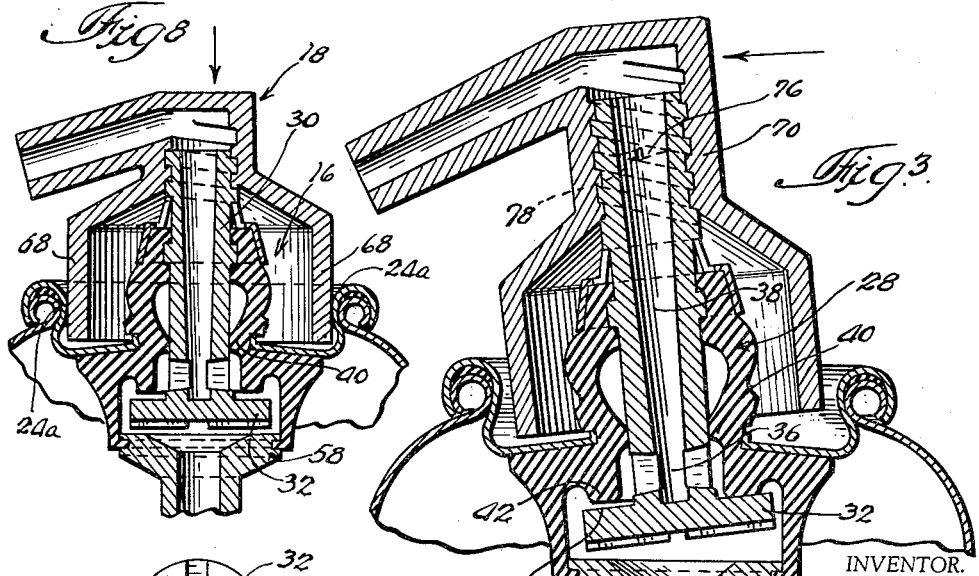
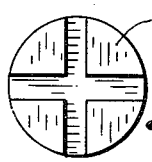
INVENTOR.
David Daniel Michel

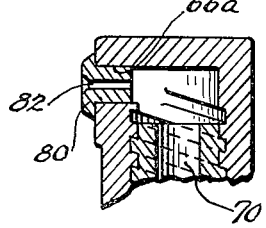
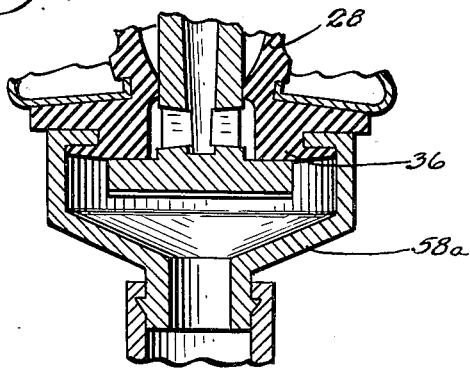
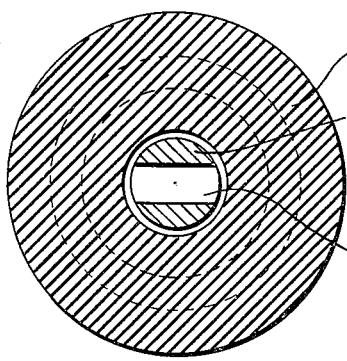
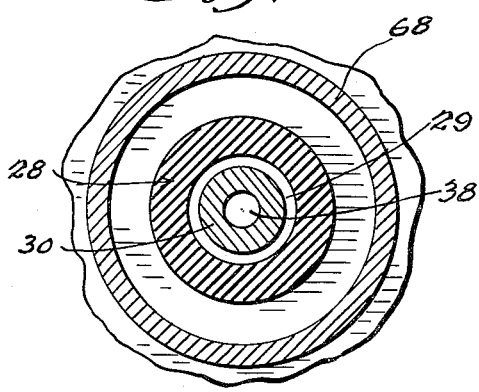
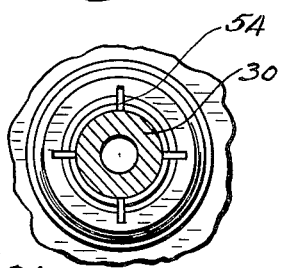
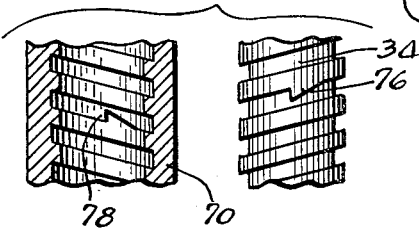

United States Patent Office 2,994,461  
Patented Aug. 1, 1961

2,994,461  
DISPENSING APPARATUS  
David Daniel Michel, 39 S. La Salle St., Chicago, Ill.  
Filed July 2, 1957, Ser. No. 669,680  
7 Claims. (Cl. 222—153)

This invention relates to dispensers and more particularly to improvements in the dispensing apparatus which is used in conjunction with pressurized containers for dispensing fluent materials.

The elements of this invention are of particular use in connection with portable containers such as are common and well known for dispensing whipped cream, shaving cream, lotions, insecticides and the like in a desired form such as a liquid, a foam, a mist or the like, but it is to be understood that this invention is not limited to any specific type of container or to any particular material.

It is one particular object of this invention to provide a dispensing apparatus which will permit the dispensing of materials from an associated container and the subsequent sealing of the container without the user having to remove or replace a sealing cover or the like.

It is a further object of this invention to provide a dispensing apparatus which permits the accurate and simple regulation of the flow of materials from an associated container.

It is still another object of this invention to provide a dispensing apparatus whereby the flow of material from an associated container may be effected without inverting or tilting the container, and the container may be sealed for long storage purposes without applying thereto an additional cover or cap.

It is still a further object of this invention to provide a dispensing apparatus employing an integrated nonremovable cover member, which when in its closed position and without the use of special gaskets is capable of developing a fluid-tight seal and of eliminating all chance of accidental discharge of the material.

It is a further object of this invention to provide a dispensing apparatus having a valve member which is adapted for use with a variety of nozzle cover members to dispense the contents of the pressurized container in different physical conditions varying for example from a foam cream to a fine spray or mist.

Other objects may be seen, and a fuller understanding of the invention may be had by referring to the following description and claims taken in conjunction with the accompanying drawings.

In accordance with one embodiment of the invention, a portable dispenser is provided which comprises a container having an open end, an apertured mounting cup, peripheral portions of which sealingly engage the container adjacent its open end, and a valve mounted in the mounting cup aperture and having an outwardly extending ajutage which is externally threaded adjacent its exposed end. This valve is of such construction that it may be actuated by either lateral or inward movement of the outwardly extending end of the ajutage. In combination with these elements, an internally threaded cover and nozzle member is provided which threadably engages the exposed end of the ajutage. A dip tube also is preferably provided, one end of which extends deep into the container adjacent the base thereof and the other end of which is operatively connected to the valve.

One particular feature of this invention is the novel design of the cover member which permits that member to cooperate with the other elements of the combination to effect improved operation. This cover member has a nozzle portion, a mounting cup abutting skirt, and an internally threaded portion intermediate the nozzle and skirt portions. The internally threaded portion is adapted to receive and engage the externally threaded portion of the ajutage. The cover member nozzle portion preferably extends radially outward from the axis of the intermediate threaded portion and directs the material flowing from the ajutage radially outward. The skirt portion of the cover member may be adjustably positioned with respect to the mounting cup by rotation of the cover member relative to the ajutage. By the positioning of this abutting portion thusly, movement effecting the opening of the value may be restricted or even prevented and the maximum flow from the container may be thus regulated.

Another feature of this invention is the novel means of connecting the dip tube to the valve member whereby the materials may be effectively transmitted from said dip tube through said ajutage and cover member nozzle. This permits the dispensing of the materials without inverting or tilting the container.

For a more complete understanding of this invention, reference is now made to the drawings wherein:

FIGURE 1 is an elevational view of a container in which the dispensing apparatus of this invention is incorporated;

FIG. 2 is an enlarged sectional view of a dispensing apparatus illustrating one embodiment of this invention;

FIG. 3 is a sectional view of the apparatus illustrated in FIG. 2, showing the nozzle member in one position for discharge;

FIG. 4 is a sectional view taken substantially on line 4—4 of FIG. 2;

FIG. 5 is a sectional view taken substantially on line 5—5 of FIG. 2;

FIG. 6 is a sectional view taken on line 6—6 of FIG. 2;

FIG. 7 is a sectional view of the apparatus showing a modified means for attaching the dip tube to the valve;

FIG. 8 is a sectional view of the apparatus showing a modified cover member;

FIG. 9 is a plan view of the bottom of the ajutage;

FIG. 10 is a sectional view of the threaded portions of the cover member and ajutage showing the stop means for preventing the accidental threadable disengagement of these two members; and FIG. 11 is a sectional view of the apparatus showing a modified cover member with an interchangeable nozzle.

As illustrated in FIG. 1, a container 10 is provided having a base 12 and an oppositely disposed shaped and apertured end 13. Mounted within the aperture in end 13 is dispensing assembly 14, which, as shown in FIG. 2, includes a valve 16, a cover member 18 and a dip tube 20.

As most clearly shown in FIGS. 2 and 3, container 10 has a peripheral bead 22 surrounding the aperture in end 13. An apertured valve-supporting mounting cup 24 is disposed transversely in the end 13 and has peripheral lip portions 24a, which extend upwardly and outwardly over the bead 22 of the container. A resilient material 25 is preferably provided between the lip 24a and bead 22 in order to effect a liquid-tight seal therebetween. Mounted within the aperture of mounting cup 24 is elongate resilient plug member 28. Aperture-defining portions of the mounting cup are upturned to provide a flange 24b in noncutting sealing engagement with the resilient member 28. As will be seen the flange portions 24b provide support for the portion of resilient member 28 which acts in the nature of a fulcrum for the movement effecting opening of valve 16.

Resilient member 28 has a central aperture 29, the internal diameter of which varies through its length. Disposed within this aperture is an elongate shaft-like ajutage or efflux tube 30 which carries adjacent its one end, within an enlarged portion of the resilient member aperture, a transversely disposed annular head member 32. The other end 34 of the ajutage extends outwardly from said resilient member and is externally threaded.

Ajutage 30 has transverse apertures 36 adjacent head member 32. A longitudinal passageway 38 connects the transverse apertures with outer end 34 of the ajutage. As will be seen the fluent material from the container 10 will, when the valve 16 is opened, flow through passageway 38 from the transversely apertured portion 36 to the outer end 34 of the ajutage. In order to permit the product and propellant to expand and throughly intermix while it is being discharged from the container, the interior walls defining passageway 38 are preferably tapered such that the diameter of this passageway increases as ajutage end 34 is approached.

Ajutage 30 is circumferentially and sealingly engaged by restricted annulus portion 40 of resilient member 28. Annulus 40 is held firmly in this sealing engaged position by means of the bearing force of circumjacent upturned flange 24b, and the engagement of the ajutage by annulus 40 is such that the ajutage may selectively move axially within this annulus and radially pivot about the annulus as a fulcrum. As will be seen in at least one embodiment of the invention valve 16 may be actuated by either of these movements. Portion 40 engages the ajutage slightly above transverse apertures 36.

Below annulus 40 and integral with resilient member 28 is a resilient valve seat 42 which surrounds aperture 29. Below this valve seat 42 aperture 29 is of increased diameter, annular resilient portion 44 defining a cavity to receive head 32. Portion 44 of the resilient member lies circumjacent valve seat 42 and extends downwardly into the container 10.

As may be seen the portion of resilient member 28 which lies between annulus 40 and valve seat 42 is so dimensioned as to be peripherally spaced from transversely apertured portion 35 of ajutage 30. In like manner the interior wall of resilient member portion 44 is peripherally spaced from head member 32. This peripheral spacing permits the materials to flow through the resilient member 29 below annulus 40, and thence through the ajutage. Annulus 40 prevents these materials from flowing further upward into the bulbous cavity of aperture 29. The upper surface 46 of the head member 32 is adapted to sealingly engage valve seat 42 and thus close valve 16 when ajutage 30 which carries the head is disposed vertically in its most upwardly extended position.

In order to maintain the valve in a normal closed position, resilient member 28 is axially compressed slightly. The ajutage is provided with an upper shoulder 50 and a lower shoulder 52 which shoulders are axially spaced apart on the exterior of the ajutage under threaded portion 34. A locking collar 54 is adapted to be slid over the threaded end 34 and to engage under shoulder 50. The lower portions of this collar 54 then extend downwardly and bear against the upper extremity 48 of the plug to force the resilient member extremity 56 radially inward into firm engagement with shoulder 52. It may be seen that thus assembled, resilient member 28 is compressed somewhat between collar 54 and head 32 to urge the ajutage shaft to its most erect upwardly extended position shown in FIG. 2.

An annular apertured adpater 58 connects dip tube 20 to valve 16. One end 60 of this adapter is peripherally grooved and of sufficient diameter to receive and sealingly engage the extremity of annular resilient portion 44. The other end 62 of this adapter is of such external diameter that it sealingly engages and fits within one end of dip tube 20 and is held in this engaged position by means of a barbed shoulder 64. The other end of dip tube 20 (not shown) preferably lies adjacent container base 12.

Although it is preferred that resilient plug 28 have downwardly extending annular portions 44 which engage adapter 58, it is quite within the scope of applicant's invention to eliminate annular portions 44 and to provide an alternative form of adapter 58a, as shown in FIG. 7.

Adapter 58a has a flared mouth which engages resilient plug 28 in an annular groove therein circumjacent valve seat 36.

Hollow cover member 18 comprises a nozzle portion 66, an annular bottom skirt 68 and an intermediate portion 70. Intermediate portion 70 is internally threaded and is adapted to engage the externally threaded portion 34 of the ajutage. Nozzle portion 66 extends radially outward from the top of portion 70 and has a passageway 66a which connects with the bore of threaded portion 70. The skirt 68 is connected to intermediate portion 70 by means of a flared or distended portion 72. In the preferred arrangement for the valve assembly 14 and as may be seen in the drawings, portions of resilient plug 28 are exposed above the surface of mounting cup 24. The annular skirt 68 of cover member 18 is of such an internal dimension that it extends over these portions and will not interfere with these portions as the cover member is moved in its various positions. The external dimension of lower portion 68 is preferably such that it may fit within upwardly extending peripheral portions 24a of mounting cup 24.

In the embodiment shown in FIGS. 2 and 3, the external surface of skirt 68 is peripherally spaced from the circumjacent peripheral portions 24a of the mounting cup. This arrangement allows the cover to be moved transversely and permits the valve assembly to be actuated by pressure upon the cover member in either an axial or radial direction, whichever is preferred. In FIG. 3, radial pressure is being applied to the cover member to effect tilting actuation of the valve 16.

In FIG. 8 a modified cover member is shown. In this modification the external dimension of skirt 68 is such that this portion is in telescopic sliding engagement with peripheral portions 24a of the mounting cup. With this arrangement, the valve will be restrained against tilting in response to radial pressure on the cover member. In order to be actuated by radial pressure, the valve must tilt about the restricted portion 40 of resilient plug 28. Inasmuch as the engagement of skirt 68 with peripheral portions 24a of the mounting cup is above the acting fulcrum portion 40, no tilting movement is possible. Thus valve 16 in the embodiment shown in FIG. 8 may be opened only by axial pressure on the cover member which causes the ajutage 30 to move inwardly against the compressive force of resilient plug 28.

It may be seen that very substantial axial pressure on cover member 18 to open the valve 16 may result in head 32 coming into engagement with the dip tube adapter 58. It is, therefore, preferred that either the bottom surface of plug 32 or the top surface of adapter 58 be channeled or grooved such that the materials will not be hindered in their flow from the dip tube when the head is fully depressed against the upper portion 60 of the adapter. As shown in FIG. 9, the bottom portion of head 32 may be channeled at right angles in order to provide optimum flow from the dip tube when the plug member is fully depressed. Although this design is particularly useful in the embodiment shown in FIG. 8, it is to be understood that this design is also useful and preferred for use in the other embodiments of the invention, as shown.

It is also preferred that a stop means be provided for preventing the accidental disengagement of the cover member and ajutage when the cover member is rotated. One type of stop means is shown in FIG. 10 which includes a wedge-like protuberance 76 which is integral with the external threads of portion 34 of the ajutage. A mating protuberance 78 is provided on the internal threads of the cover member intermediate portion 70. This arrangement, of course, operates best when the ajutage and cover member are constructed of materials of a somewhat resilient characteristic such as available in most plastics. Cover member 18 may be threaded on end 34 of the ajutage until the sloping faces of these mating protuberant portions 76 and 78 of the ajutage and cover member, respectively, are forced past each other. The subsequent disengagement of the cover member 18 and ajutage 30 is prevented by the contacting of the straight faces of these protuberant portions.

In operation, the dispensing apparatus 14, in the embodiment illustrated in FIGS. 2 and 3, may be actuated by downward axial pressure or radial pressure applied to the cover member, whichever is preferred. Axial pressure downward upon cover member 18 causes ajutage 30 to move downward, separating head 32 from seat 42. The fluent materials which are contained in container 10 under pressure may then flow through dip tube 20 into the aperture of resilient member 28 and thence through transversely apertured portion 36 and longitudinal passageway 38 in ajutage 30. The materials are guided radially outward by means of connecting nozzle 66 in cover member 18.

By applying pressure in a radial direction to the cover member 18, the seal between plug member 32 and valve seat 42 is broken, as shown in FIG. 3, which also permits the flow of the materials held under pressure in the container up through the valve and radially outward through nozzle 66.

It may be seen that when cover member 18 is threadably positioned at its farthest point upward on ajutage 30 with protuberances 76 and 78 engaged, axial or radial pressure applied to cover member 18 will open the valve its maximum amount and produce the maximum flow from the container. However, when cover member 18 is threadably advanced on ajutage 30 and approaches the point at which skirt 68 thereof abuts the transverse surface of mounting cup 24, movement of the cover member is increasingly restricted and thus the amount which the valve may be opened is correspondingly restricted. When abutting skirt 68 is brought into contact with the transverse surface of mounting cup 24, it is obvious that neither downward axial motion nor radial motion of the cover member is possible and therefore the valve may not be opened at all. When the cover member 18 is moved to a position between its two extreme positions, the valve may be opened by either axial or radial pressure applied to the cover member; however, depending upon the proximity of skirt 68 of the cover member with the transverse surface of mounting cup 24, the amount of opening permitted between head 32 and valve seat 42 may be accurately regulated. This, in turn, regulates the maximum flow of materials from the dispensing apparatus. It may be desirable to provide some indicia upon container 10 adjacent its open end or upon the peripheral portions of mounting cup 24 such that the amount of flow may be indicated by the position of radially extending nozzle portion 66. Thus, the user would be able to accurately know the maximum flow from the container by the position of nozzle 66 with respect thereto. This is especially true of the modified apparatus shown in FIG. 8 where only axial pressure will actuate the valve, and the difference between axial and radial movement of the cover member need not be considered in determining the maximum flow from the dispensing apparatus.

The unique valve design permits use of a modified cover member such as illustrated in FIG. 11. All portions of this modified cover are substantially identical with the previously described cover member except the nozzle 66 is eliminated, and a nozzle in the form of an apertured insert 80 is forced into passageway 66a, which preferably is normal to the axis of intermediate portion 70 in this modified cover. The aperture 82 of insert 80 may be of any desired size or shape depending upon the physical form in which the materials are to be dispensed. The aperture illustrated in FIG. 11 is used to produce a spray or mist. It may be seen that the valve and cover member are thus standardized and different materials may be dispensed in different physical conditions from dispensers which are identical in all respects except for the aperture of nozzle insert 80.

It may be seen that a novel and improved dispensing apparatus has been provided which is very simple in construction and which permits the flow of materials from a pressurized container at a regulated rate. A positive liquid-tight seal is also effected without the use of additional gaskets, and no cover or cap need be removed in order to operate the dispenser. This eliminates the tendency to misplace or lose the cap.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A portable dispenser comprising a container for materials to be dispensed having a base and an oppositely disposed open end, an apertured mounting cup peripheral portions of which sealingly engage said container adjacent the open end thereof, a dip tube extending within said container and having one end disposed adjacent the base thereof, an elongate apertured resilient member disposed within said mounting cup and having aperture defining portions adjacent one end operatively connected to the other end of said dip tube, said resilient member having a valve seat portion disposed within said aperture and spaced from said dip tube other end, an elongate ajutage carrying an integral valve seat mating plug member adjacent one end, being externally threaded adjacent the other end and being sealingly disposed within said resilient member aperture such that said plug member is intermediate said valve seat portion and said dip tube other end, means biasing said ajutage in a direction to effect sealing engagement between said plug member and said valve seat portion, the portions of said resilient member defining the aperture therein being spaced from the peripheries of said ajutage plug member and transversely apertured portion to permit free movement of said plug member and allow flow through said ajutage when said plug member and valve seat are separated, said plug member having the surface adjacent said dip tube other end transversely grooved to permit passage of materials from said dip tube when said ajutage and plug member are fully depressed, an internally threaded cover member which is adapted to receive and be threaded upon said ajutage other end, said cover member having a nozzle portion which extends radially outward from the axis of said threaded portion, and an abutting portion which is adapted to abut said mounting cup when said cover member is either threadably advanced on said ajutage, or moved with said ajutage to effect separation of said plug member and said valve seat portion, whereby the cover member serves to reinforce said ajutage biasing means and to regulate the maximum flow from said container.

2. A portable dispenser comprising: a container for materials to be dispensed having a base and an oppositely disposed open end; a recessed, apertured mounting cup sealingly disposed in the open end of said container; a valve sealingly disposed within said mounting cup having a centrally apertured resilient valve seat means and a protruding externally threaded, fluid-conducting, valve-actuating ajutage extending therethrough; said valve seat means being compressed between spaced portions of said ajutage whereby said valve is urged to a closed position, a dip tube connected to said valve and extending within said container to adjacent the base thereof; and a cover member having an internally threaded portion adapted to receive and be threaded upon said ajutage, a nozzle portion extending radially outward from the axis of said threaded portion, and an abutting skirt portion disposed within said recessed mounting cup, the external surface of said skirt portion being peripherally spaced from the circumjacent portions of said mounting cup, said cover member being movable between an open position in which said skirt portion is spaced a selected distance from the bottom of said mounting cup to regulate the degree to which said valve may be opened and a closed position in which said skirt portion abuts the bottom of said mounting cup to relieve the compression of said valve seat means and maintain said valve in its closed position.

3. A portable dispenser comprising: a container for materials to be dispensed having a base and an oppositely disposed open end; a recessed, apertured mounting cup sealingly disposed in the open end of said container; a valve sealingly disposed within said mounting cup having a protruding externally threaded, fluid-conducting, valve-actuating ajutage; and a cover member having an internally threaded portion adapted to receive and be threaded upon said ajutage and a nozzle portion extending radially outwardly from said threaded portion, two resilient formations, one extending from the externally threaded end of said ajutage and the other extending from the internally threaded portion of said cover member in interfering relationship, said formations being substantially wedge shaped to permit the threading of said cover member onto said ajutage, but to prevent the subsequent removal thereof from said ajutage.

4. A portable dispenser comprising: a container for materials to be dispensed having a base and an oppositely disposed open end; an apertured recessed mounting cup peripheral portions of which sealingly engage said container adjacent the open end thereof; a dip tube extending within said container and having one end disposed adjacent the base thereof; an elongate apertured resilient member disposed within said mounting cup and having aperture defining portions adjacent one end operatively connected to the other end of said dip tube, said resilient member having a valve seat portion disposed within said aperture defining portions and spaced from said dip tube other end; an elongate hollow, fluid-conducting ajutage externally threaded at one end, a valve seat mating plug member connected to said ajutage adjacent the other end thereof and disposed within said resilient member aperture intermediate said valve seat portion and said dip tube other end, said ajutage being urged in a direction to effect sealing engagement between said plug member and said valve seat portion, said plug member having the surface adjacent said dip tube other end transversely grooved to permit passage of materials from said dip tube when said ajutage and plug member are fully depressed; and a cover member having an internally threaded portion adapted to receive and be threaded upon said ajutage, a nozzle portion extending radially outward from the axis of said threaded portion, and an abutting skirt portion disposed within said recessed mounting cup, the external surface of said skirt portion being peripherally spaced from the circumjacent portions of said mounting cup, said cover member being movable between an open position in which said skirt portion is spaced a selected distance from the bottom of said mounting cup to regulate the degree to which said valve may be opened and a closed position in which said skirt portion abuts the bottom of said mounting cup to reinforce said valve, two resilient formations, one extending inwardly from the externally threaded end of said plug member and the other extending outwardly from the internally threaded portion of said cover member, said formations being substantially wedge shaped to permit the threading of said cover member onto said plug member, but to prevent the subsequent removal thereof from said plug member.

5. A portable dispenser comprising: a container for materials to be dispensed having a base and an oppositely disposed open end; a recessed, apertured mounting cup sealingly disposed in the open end of said container; a valve sealingly disposed within said mounting cup having a centrally apertured resilient valve seat means and a protruding externally threaded, fluid-conducting, valve-actuating ajutage extending therethrough; said valve seat means being compressed between spaced portions of said ajutage whereby said valve is urged to a closed position; and a cover member having an internally threaded portion adapted to receive and be threaded upon said ajutage and a nozzle portion extending radially outwardly from said threaded portion, two formations, one extending from the externally threaded end of said ajutage and the other extending from the internally threaded portion of said cover member in interfering relationship, said formations being resilient and substantially wedge-shaped to permit the threading of said cover onto said ajutage, but to prevent the subsequent removal thereof from said ajutage, the compression of said valve seat means being relieved whenever said cover member is threaded onto said ajutage to engage said mounting cup.

6. A portable dispenser comprising: a container for materials to be dispensed having a base and an oppositely disposed open end; a recessed, apertured mounting cup sealingly disposed in the open end of said container; a valve sealingly disposed within said mounting cup having a protruding externally threaded, fluid-conducting, valve-actuating ajutage; a dip tube connected to said valve and extending within said container to adjacent the base thereof; and a cover member having an internally threaded portion mounted on said ajutage for threadable adjustment with respect thereto, a nozzle portion extending radially outward from the axis of said threaded portion, and an abutting skirt portion disposed within said recessed mounting cup, the external surface of said skirt portion being peripherally spaced from the circumjacent portions of said mounting cup, said cover member being axially movable on said ajutage between an open position in which said skirt portion is spaced a selected distance from the bottom of said mounting cup to regulate the degree to which said valve may be opened and a closed position in which said skirt portion abuts the bottom of said mounting cup to maintain said valve in its closed position, two formations, one extending from the externally threaded end of said ajutage and the other extending from the internally threaded portion of said cover member, said formations being substantially wedge shaped and resilient to permit the threading of said cover member onto said ajutage, but to prevent the subsequent removal thereof from said ajutage.

7. A portable dispenser comprising: a container for materials to be dispensed having a base and an oppositely disposed open end; an apertured mounting cup peripheral portions of which sealingly engage said container adjacent the open end thereof; a dip tube extending within said container and having one end disposed adjacent the base thereof; an elongate apertured resilient member disposed within said mounting cup and having aperture defining portions adjacent one end operatively connected to the other end of said dip tube, said resilient member having a valve seat portion disposed within said aperture defining portions and spaced from said dip tube other end; an elongate hollow, fluid-conducting ajutage externally threaded at one end, a valve seat mating plug member connected to said ajutage adjacent the other end thereof and disposed within said resilient member aperture intermediate said valve seat portion and said dip tube other end, said resilient member being compressed in a direction to effect sealing engagement between said plug member and said valve seat portion, said plug member having the surface adjacent said dip tube other end transversely grooved to permit passage of material from said dip tube when said ajutage and plug member are fully depressed; and a cover member having an internally threaded portion adapted to receive and be threaded upon said ajutage, a nozzle portion extending radially outward from the axis of said threaded portion, and an abutting skirt portion disposed within said recessed mounting cup, the external surface of said skirt portion being peripherally spaced from the circumjacent portions of said mounting cup, said cover member being movable between an open position in which said skirt portion is spaced a selected distance from the bottom of said mounting cup to regulate the degree to which said valve may be opened and a closed position in which said skirt portion abuts the bottom of said mounting cup to reinforce said valve and relieve said compression.

References Cited in the file of this patent

UNITED STATES PATENTS

| | | |
|---|---|---|
| 1,551,567 | Jeffrey | Sept. 1, 1925 |
| 1,563,813 | Washington et al. | Dec. 1, 1925 |
| 1,653,735 | Brinkman | Sept. 29, 1953 |
| 2,704,622 | Soffer | Mar. 22, 1955 |
| 2,753,092 | Smith | July 3, 1956 |
| 2,831,608 | Soffer et al. | Apr. 22, 1958 |
| 2,849,163 | Soffer et al. | Aug. 26, 1958 |
| 2,877,936 | Michel | Mar. 17, 1959 |

UNITED STATES PATENT OFFICE
CERTIFICATION OF CORRECTION

Patent No. 2,994,461                      August 1, 1961

David Daniel Michel

It is hereby certified that error appears in the above numbered patent requiring correction and that the said Letters Patent should read as corrected below.

Column 3, line 10, for "throughly" read -- thoroughly --; line 62, for "adpater" read -- adapter --; column 10, list of references cited, add the following:

2,889,086    Collins -------- June 2, 1959

Signed and sealed this 3rd day of April 1962.

(SEAL)
Attest:

ERNEST W. SWIDER
Attesting Officer

DAVID L. LADD
Commissioner of Patents